Jan. 30, 1968   F. J. LUKETA   3,366,969
QUANTITY MEASUREMENT OF FISH IN A TRAWL NET
Original Filed Aug. 31, 1964   7 Sheets-Sheet 1

INVENTOR.
FRANK J. LUKETA
BY *Mathis & Draybeal*
ATTORNEYS

Jan. 30, 1968 F. J. LUKETA 3,366,969
QUANTITY MEASUREMENT OF FISH IN A TRAWL NET
Original Filed Aug. 31, 1964 7 Sheets-Sheet 3

INVENTOR.
FRANK J. LUKETA
BY
ATTORNEYS

Jan. 30, 1968   F. J. LUKETA   3,366,969
QUANTITY MEASUREMENT OF FISH IN A TRAWL NET
Original Filed Aug. 31, 1964   7 Sheets-Sheet 4

INVENTOR.
FRANK J. LUKETA
BY
ATTORNEYS

INVENTOR.
FRANK J. LUKETA

United States Patent Office 3,366,969
Patented Jan. 30, 1968

3,366,969
QUANTITY MEASUREMENT OF FISH IN
A TRAWL NET
Frank J. Luketa, 5567 Greenwood Ave. N.,
Seattle, Wash. 98103
Continuation of application Ser. No. 489,793, Sept. 7, 1965, which is a continuation of application Ser. No. 393,236, Aug. 31, 1964. This application Dec. 19, 1966, Ser. No. 607,128
13 Claims. (Cl. 43—9)

ABSTRACT OF THE DISCLOSURE

Trawling apparatus having load sensing line means connected to the codend of the trawl net and extending forwardly therefrom to a load sensing means mounted on a trawl door for deriving a signal based on the tension in the load sensing line means caused by pressure of fish in the codend. The derived signal is transmitted to the trawler to indicate the quantity of fish in the net.

This application is a continuation of my now abandoned, copending application, Ser. No. 489,793, entitled, Apparatus for Measuring the Quantity of Fish in a Trawl Net, and filed Sept. 7, 1965, as a continuation of my now abandoned application Ser. No. 393,236 entitled, Method and Apparatus for Measuring the Quantity of Fish in a Trawl Net, and filed Aug. 31, 1964, as a continuation-in-part of my prior application Ser. No. 305,485, filed Aug. 29, 1963, as a continuation of my prior, now abandoned, application Ser. No. 52,141, filed Aug. 26, 1960, the latter two applications both being entitled, Trawl Net Load Responsive Apparatus and Method.

The present invention relates to trawling, and more particularly to an apparatus for determining the quantity of fish in the net from aboard the trawler.

It is old to connect the forward ends of the towing warps of a trawl net to load sensing means situated aboard the trawler for the purpose of measuring the increase in the total drag of the net assembly that is produced by the fish being caught by the net, or by the net snagging on some bottom obstacle. Systems of this general type are disclosed by U.S. Patent No. 2,079,021, issued May 4, 1937, to John C. Malcolm and Ralph S. Symonds, and in U.S. Patent No. 2,513,153, issued June 27, 1950, to Vito D'Intino.

An entire trawl net assembly, even a relatively small one, produces an appreciable drag when empty. Beginning with the codend, the drag increases with each net component forwardly of the codend—the curtains and sweep lines, the doors and finally the towing warps. Each adds its individual drag to the total. As fish are added to the net, the total drag is increased, but not by an amount equal to the weight of such fish out of the water. In fact, a full load of fish in the codend of a net will increase the total drag of the entire net assembly by an amount which is relatively small in relation to the drag of the net assembly when the net proper is empty.

In systems of the type disclosed in the Malcolm et al. patent, for example, the increase in the total drag does not give the trawl operator a reliable indication of the quantity of fish in the net. This is because the drag produced by fish in the net is a relatively very small percentage of the total. Such total drag is a relatively large value and requires the employment of a load indicating device that is capable of recording a relatively large force. In some cases, the portion of the total drag attributed to fish in the net, representing the increase in drag over and above the drag of the empty net and the other components of the net assembly, may be close in value to the error of the measuring instrument. As a result the trawl operator is not given a reliable indication of the quantity of fish in the net.

This invention involves an apparatus for measuring only that portion of the total drag of the net that is produced by water and by fish in the net pressing against the rear wall of the net's codend; deriving an electrical signal based on such portion of the total drag; and then transmitting such signal to receiving equipment situated aboard the trawler whereat it is utilized to give the trawl operator a reliable indication of the quantity of fish in the net. By continuously reading and/or recording this signal during trawling the trawl operator can tell when and where the fish are being caught, and when the net is full and ready to be hauled in.

Generally speaking, the load sensing equipment of the present invention comprises a load sensing device (e.g. a strain gage) mounted on a portion of the towing means for the net, such as one of the trawl doors, for example; load sensing line means interconnecting between said load sensing device and the pursed after terminal of the net's codend, with said load sensing device serving to measure the tension put into said load sensing line means by reason of water and fish in the net pressing against the rear wall of the codend and to derive an electrical signal based on such tension; means for transmitting said signal to the trawler; and means on the trawler for receiving and utilizing the signal, such as a meter having a dial which can be read directly by the operator, for example. The towing means for the net includes the sweep lines SL, the curtain lines 16, the doors 10, and the towing warps 12.

Preferably the load sensing line means is shorter in length than the normal distance between the load sensing device and the pursed terminal of the net so that during trawling the after end portion of the codend is pulled outside in by the load sensing line means, and a generally annular rear wall formed. As the fish press relatively rearwardly against this rear wall there is a tendency for the pursed terminal of the codend to be displaced rearwardly to its normal position. Such displacement is resisted, and to a large extent prevented, by the load sensing line means, but the load sensing line means is put in tension, and the value of such tension is directly proportional to the force or drag produced by the fish pressing against said rear wall.

These and other characteristics, features, objects and advantages of the present invention will be apparent from the following description of certain typical embodiments thereof, taken together with the accompanying illustrations, wherein like letter designations and like numerals refer to like parts, and wherein:

Figure 1:
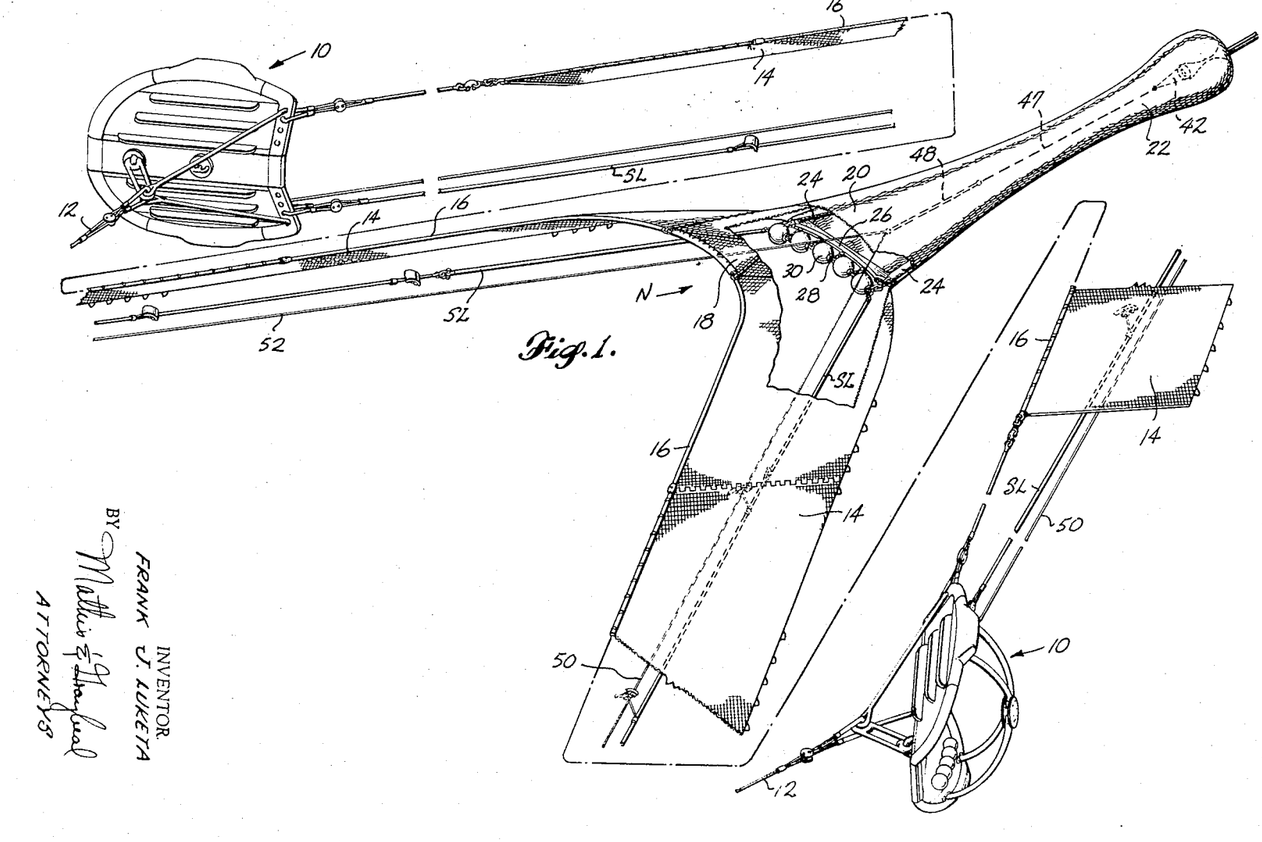
FIG. 1 is a perspective view presented as three related sections, illustrating a bottom trawl net layout, for sake of example, with the net broken away in the region above a suspension bar and its associated elements, such net incorporating a load sensing apparatus constructed and arranged according to the present invention.

Referring more specifically to FIG. 1, the trawl net assembly illustrated thereby includes a trawl door 10 at each side of a net N, which doors are dragged forwardly by towing warps 12 extending aft from a trawler. The doors 10 spread apart net side members or curtains 14 which depend from curtain lines 16. The after ends of curtains 14 connect to the upper mesh panel 18 of a funnel 20, which extends aft and merges into the codend 22. The funnel 20 and codend 22 together form the body of the net. Suspenders 24 constructed of mesh material are located on each side of and in effect constitute parts of the funnel 20. At their respective forward ends the suspenders 24 are each gathered together and formed into loops by which they are secured to the respective ends of a transverse suspension bar 26. Through the suspension bar 26 and several connector elements the forward or looped ends of the suspenders 24 are connected each with a separate sweep line SL which extends forwardly of the net and is anchored onto one of the doors 10. The sweep lines SL through the suspenders 24 assume the major portion of the drag of the codend 22 and its catch. A transverse bobbin line 28 extends in front of the suspension bar 26 and at intervals along its length, in between the bobbins 30, is suitably joined to the suspension bar 26. Bobbins 30 rotate on bobbin line 28 while the net is being dragged over the bottom. A suitable bobbin assembly is described in detail in my U.S. Patent No. 3,121,968, issued Feb. 25, 1964. The structural relation of the suspenders 24 to the funnel 20 is fully disclosed in, and in part forms the subject matter of, my allowed copending application Ser. No. 259,230, filed Feb. 18, 1963, now Patent No. 3,188,765, and entitled Trawl Net Construction.

Figures 7, 8, 9:
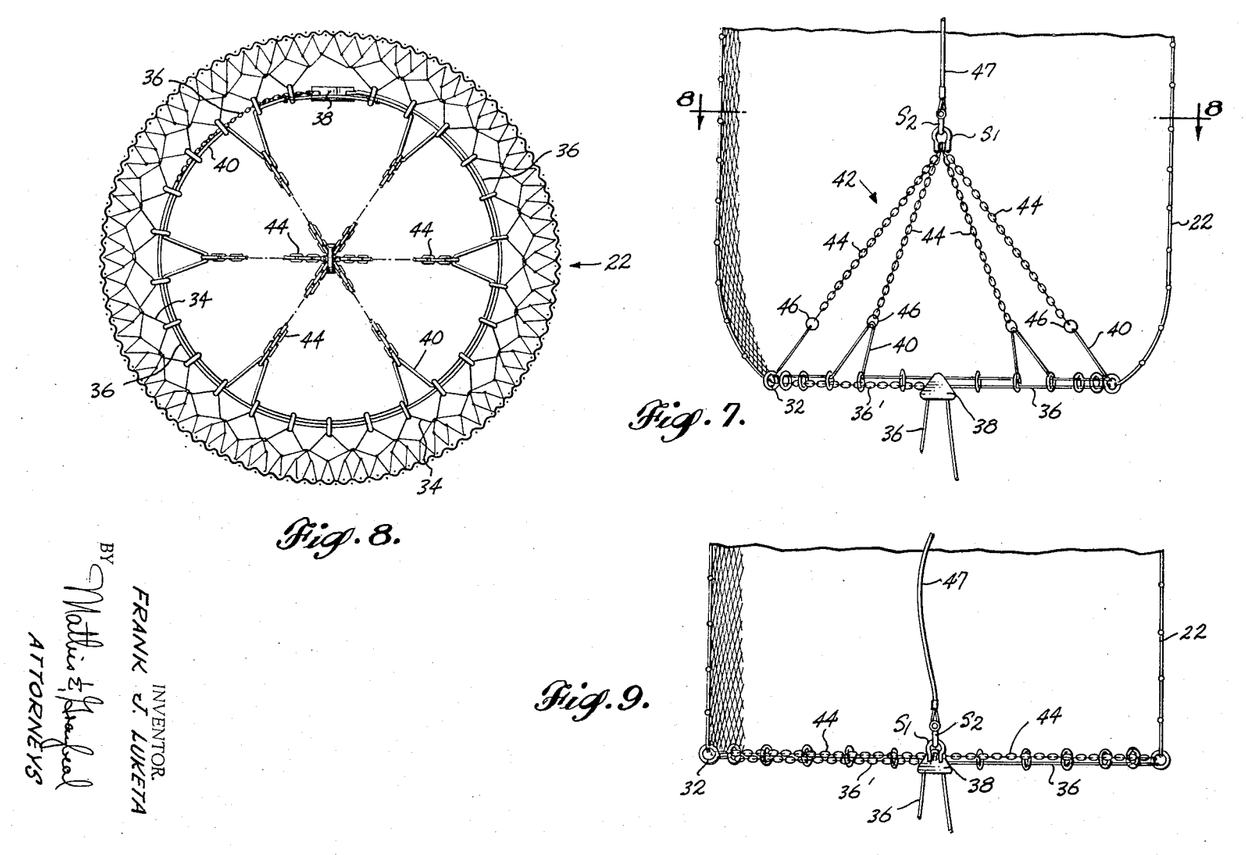
FIG. 7 is a longitudinal sectional view of the after portion of the codend, with the after terminal shown in a partly open condition.
FIG. 8 is a cross-sectional view taken through the codend, looking rearwardly toward the pursing mechanism which is shown in a partly open condition, such view being taken substantially along line 8—8 of FIG. 7.
FIG. 9 is a view similar to FIG. 7, but showing the after terminal fully open.

FIGS. 2–11 show in detail a typical pursing or closure mechanism for the outlet to the codend, together with the after portion of the load line means, hereinafter to be described in detail. As perhaps best shown in FIGS. 8–11, a plurality of eyes or eye rings 32 are distributed about the rear end opening of the codend 22 and are secured to the codend by means of a ring line 34 woven alternately through a ring 32 and then through several of the meshes defining the outlet opening, as shown by FIG. 8, for example. A purse line 36 extends successively through the rings 32 and serves as the means by which the meshes at the rear terminal of the codend may be gathered together so as to close the rear end of the codend 22. The purse line 36 may include a section of chain 36' and a codend lock and release mechanism 38 of the type disclosed in and forming the subject matter of my U.S. Patent No. 3,044,206, issued July 17, 1962. For a more detailed description of the structural makeup and operation of the typical and therefore non-limitive form of codend closure mechanism that is illustrated, reference is made to such Patent No. 3,044,206.

An anchor line 40 also extends successively through the eye rings 32. Line 36 is substantially equal to the circumference or perimeter of the open outlet opening. A load sensing line means is connected to the after terminal of the codend by the line 40. The load sensing line means then extends forwardly of the codends after terminal, through the interior of the codend 22, and is connected at its forward end to a load sensing device LS which is preferably mounted on a portion of the towing means for the net, either aft or rearwardly of the doors 10. The load sensing device will hereinafter be described in detail.

The rear portion of the load sensing line means preferably comprises a bridle 42 consisting of a plurality of bridle members 44 which are shackled or otherwise secured together at their forward ends and are secured at their after ends to the rear terminal of the codend 22 by means of the line 40. Preferably, the bridle members 42 consist of short lengths of light chain, and the line 40 extends through the last link 46 of each such member 44.

When the purse line 36 is drawn tight so as to close the outlet opening, slack is developed in both line 34 and line 40. During trawling the load sensing line means is in tension and exerts a pull on these lines 34, 40, pulling them into a sinuous shape (FIGS. 2, 3, 8 and 10, for example).

In the preferred form of the invention the forward ends of the bridle members 44 are gathered together and connected, as by a pair of shackles S1, S2, to the rear terminal of a relatively short length of a small diameter wire rope or cable 47. Preferably, a section 48 of high strength elastic material, such as a piece of rubber having the necessary tensile strength, for example, is connected to and extends forwardly of the line 47. At its forward end the elastic member 48 is connected to the after ends of a pair of small diameter lines 50, 52 which diverge apart as they extend forwardly, each to a different one of the doors 10. One of such lines 50, 52, say line 52, for example, is merely connected to its door 10. The load sensing device LS is located on the opposite door 10, and the forward end of line 50 is connected to said load sensing device LS, as will now be described.

The load sensing device LS may assume various forms. The typical and therefore nonlimitive embodiment of such a device (FIGS. 14 and 15) comprise a rocker arm 54 provided at one end with a shackle 56 connecting it to the forward end of the line 50. The opposite end of the rocker arm 54 is pivotally connected to the end of a piston rod 58. A piston 60 carried by the piston rod 58 is received in a hydraulic cylinder 62. The cylinder 62 is designed to withstand the pressures generated internally and externally and is provided with a side port 64 which communicates with the interior of a hydraulic pressure sensing electrical transducer device 66. The rocker arm 54 is pivotally mounted by means of a relatively short, fixed shaft 68 which is secured to a mounting plate 70. The mounting plate 70 is in turn suitably secured to the door 10.

When tension develops in the line 50, the rocker arm 54 tends to rotate in the counterclockwise direction (as viewed in FIGS. 14 and 15), but its turning is resisted by the hydraulic fluid present in the cavity 72. Slight movement of the rocker arm 54 does occur, however, causing the piston 60 to move against and increase the pressure of the hydraulic fluid. This increased hydraulic pressure is transmitted through the port 64 to the interior of transducer device 66 wherein it actuates a means (not shown) to convert pressure into an electrically detectable signal. A Bourbon tube, diaphragm, or other means responsive to hydraulic pressure and actuating a potentiometer or piezoelectric detector, are representative of transducer arrangements which may be employed.

Preferably the piston rod 58 extends through an opening in the end of cylinder 62 opposite the rocker arm 54. By virtue of this arrangement the water pressure on the piston rod 58, and hence on the rocker arm 54, are equalized.

An electrical conductor extends inwardly from the transducer device 66 through a watertight conductor 74 preferably to a watertight electrical connection 76 secured to the door 10.

Figure 14:
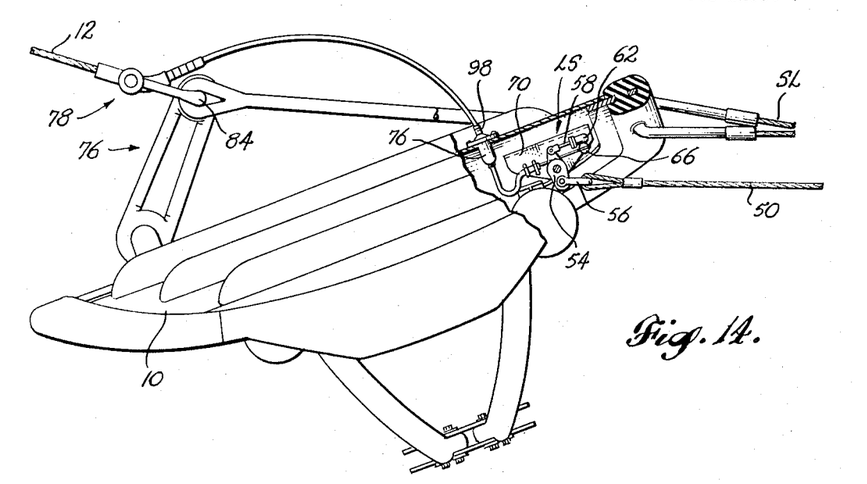
FIG. 14 is a top plan view of the trawl door which mounts the load measuring device, with a portion of said door being broken away so as to present a clear showing of a typical load measuring device.
Figures 15, 16, 17, 18:
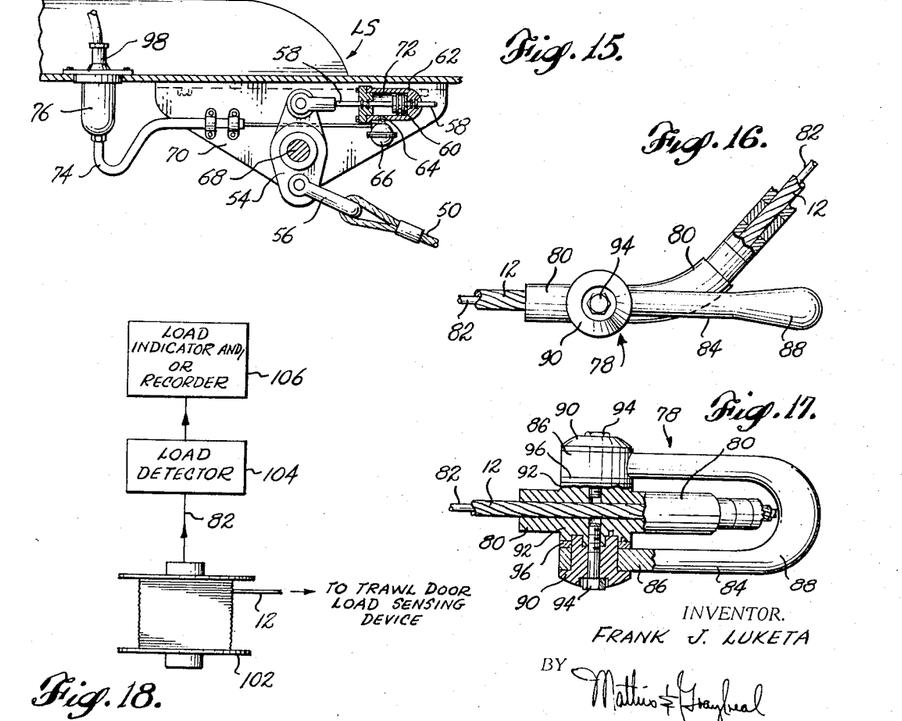
FIG. 15 is a fragmented, top plan view of that portion of FIG. 14 in the immediate vicinity of said load measuring device, but on a larger scale than FIG. 14.
FIG. 16 is a fragmentary top plan view of that portion of FIG. 14 in the immediate vicinity of the shackle device which connects the electrical conductor containing towing warp to the door bridle.
FIG. 17 is a side elevational view of the shackle device shown by FIG. 16.
FIG. 18 is a schematic view of a typical utilization device for the signal derived by the load measuring device.

Referring now to FIGS. 14, 16 and 17, a towing warp bridle 76 stands out from the door on its anterior side and is connected to a towing warp 12 by means of a shackle 78, preferably of the type disclosed in and in part forming the subject matter of my aforementioned application Ser. No. 305,485.

Referring now to FIGS. 16 and 17 in particular, the shackle 78 comprises an elongated tubular member 80 through which the towing warp 12 extends. The towing warp 12 has as a core an electrical cable 82 which comprises one or more insulated electrical conductors. The towing warp 12 is swaged on to the tubular member 80 or is otherwise secured therein against relative longitudinal movement. The shackle 78 also includes a generally U-shaped clevis type member 84 having apertured ends 86 and a bight portion 88. A flange and headed grommet 90 extends through the aperture in each end portion 86 and bears against one side of a related one of a pair of bosses 92 formed on opposite sides of and intermediate the ends of tubular member 80. These grommets 90 are secured in place by means of bolts 94, or the like, which thread into internally threaded openings formed in the bosses 92. Wear washers 96 may be interposed between the inboard side surfaces of the end portions 86 and adjacent surfaces of the bosses 92.

Rearwardly of the bolts 94 the tubular member 80 curves outwardly so as to direct the cable 82 away from the clevis member 84 which, in its normal load position, is in a plane aligned with the direction of extent or pull of the towing warp 12 (FIG. 16).

A terminal fitting 98 is provided at the extreme rear end of electrical conductor 82, and such fitting mates and forms a watertight connection with a complementary fitting 76 on the door into which the conduit 74 and the electrical conductor therein extend.

Figures 12, 19, 21:
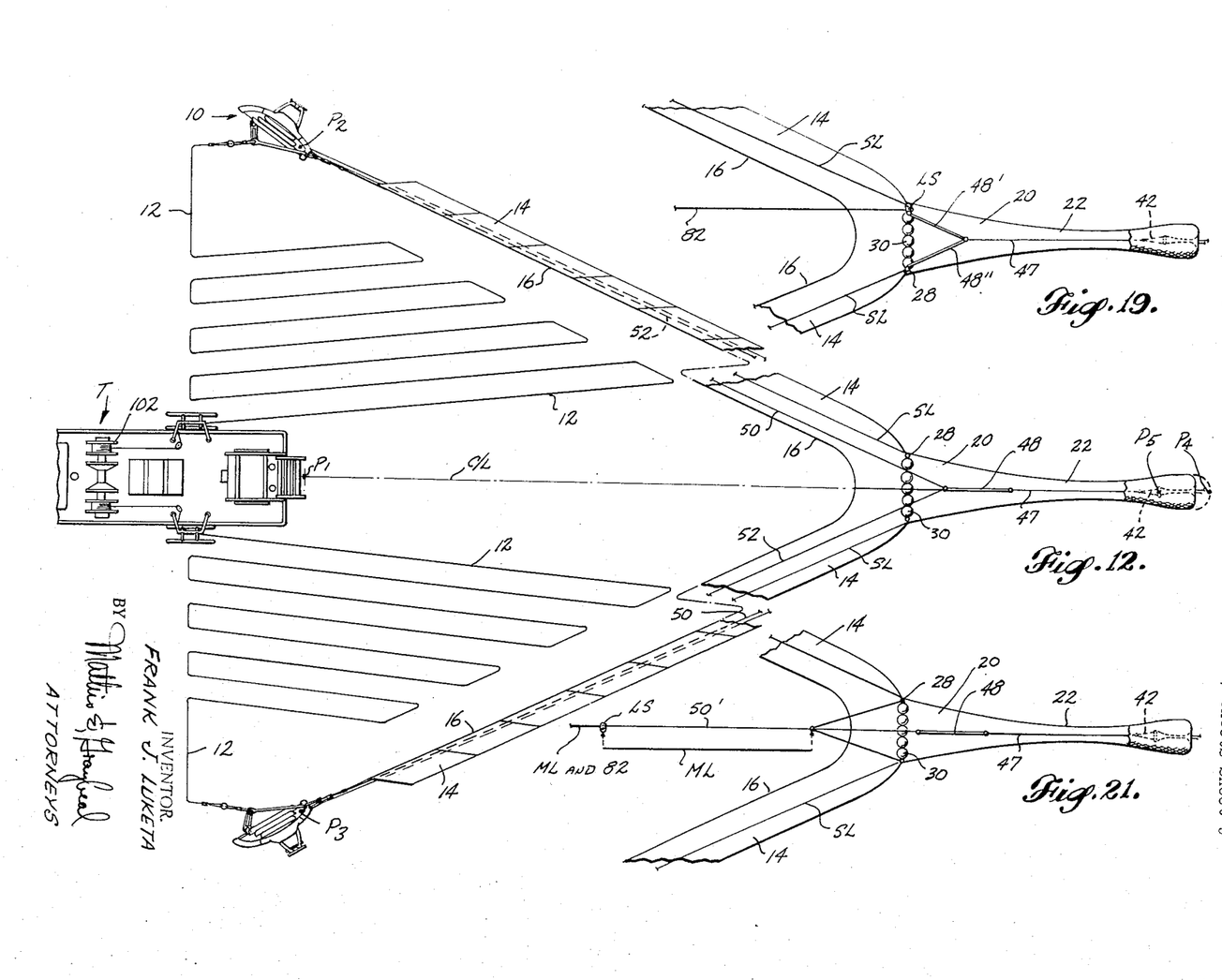
FIG. 12 is a plan view of a trawl net assembly incorporating one form of load sensing means constructed and arranged according to the present invention, with the forward portion of the net, and the doors, lines and trawler ahead of the net, being shown in top plan, with the rear portion of the net being shown on an enlarged scale and in bottom plan, with the forward part of the codend being cut away for clarity of illustration, and with the loading sensing means including a load measuring device mounted on one of the trawl doors.
FIG. 19 is a view similar to FIG. 12, but of only the codend, the funnel, and small portions of the net side elements, such view showing a modified arrangement of the load sensing apparatus, involving a load measuring device mounted on the lower suspension assembly.
FIG. 21 is a view like FIG. 19, but of still another modified arrangement of the load sensing apparatus, involving a load measuring device mounted on a mid line, representing a component of the net towing means, with a section of the mid line, which mid line extends substantially vertically below the load sensing line means during trawling, being offset to one side of the load sensing line means for clarity of illustration.

As schematically shown by FIG. 18, the towing warp 12 is wound onto a winch drum 102 situated aboard the trawler T (FIG. 12). The core conductor 82 immerges from the winch drum 102, as by means of a brush and slip ring arrangement (not shown), for example, and extends to a load detector 104 which may comprise an electrical amplifier bridge circuit, or other electrically responsive device. The output of the load detector 104 may be applied to a load indicator and/or recorder 106 which indicates and/or records for the benefit of the operator the existing load condition in the load sensing line means 42, 47, 48, 50, 52.

Figures 13, 20, 22:
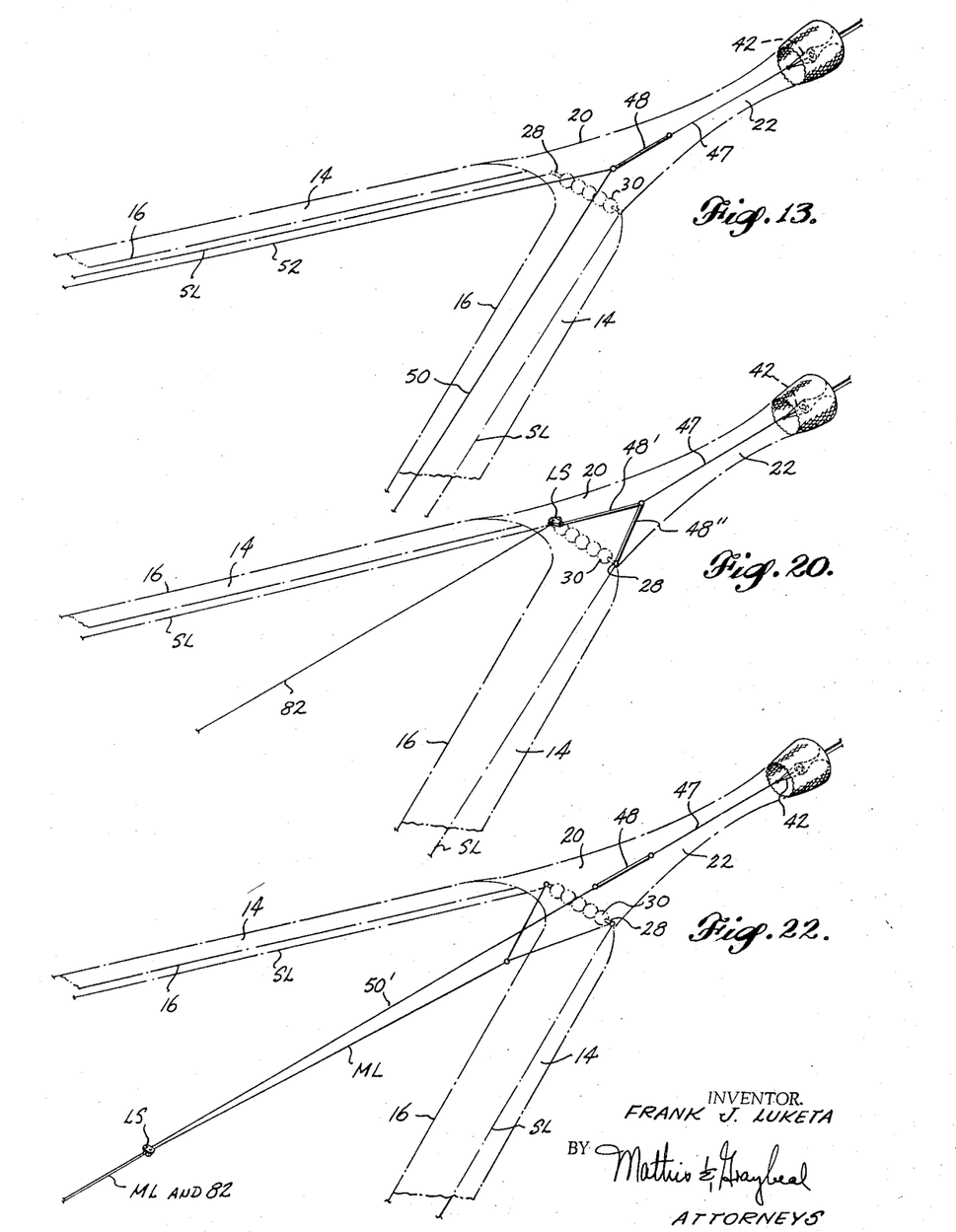
FIG. 13 is a fragmentary, perspective view of the rearward portion of the net assembly shown in FIG. 12.
FIG. 20 is a view similar to FIG. 13, but of the modified arrangement shown by FIG. 19.
FIG. 22 is a view like FIGS. 13 and 20, but of the arrangement of FIG. 21.

Referring back to FIGS. 2 and 3, and to FIGS. 12 and 13, the load sensing line means 42, 47, 48, 50, 52, is intentionally designed to be shorter fore and aft than the distance rearwardly from a point on the centerline of the net in a common transverse plane with the point of connection of the forward end of line 50 to the rocker arm 54, and of the line 52 to the opposite door 10, rearwardly to the position which the pursed after terminal of the codend 22 would take if the net end were to be fully distended and the load line means 42, 47, 48, 50, 52 were to be unattached. This is illustrated in FIG. 12. Point P1 represents the point on the centerline C/L of the net N which is in a common transverse plane with point P3 representing the point of connection of the line 50 with rocker arm 54, and point P2, representing the point of connection of line 52 with the port side door 10. Point P4 represents the position which would be occupied by the pursed rear terminal of the codend 22 during trawling if the load sensing line means 42, 47, 48, 50, 52, where not attached. Point P5 represents the position which the pursed rear terminal does occupy with said load line sensing means 44, 47, 48, 50, 52 attached.

Figures 2, 4, 5, 6:
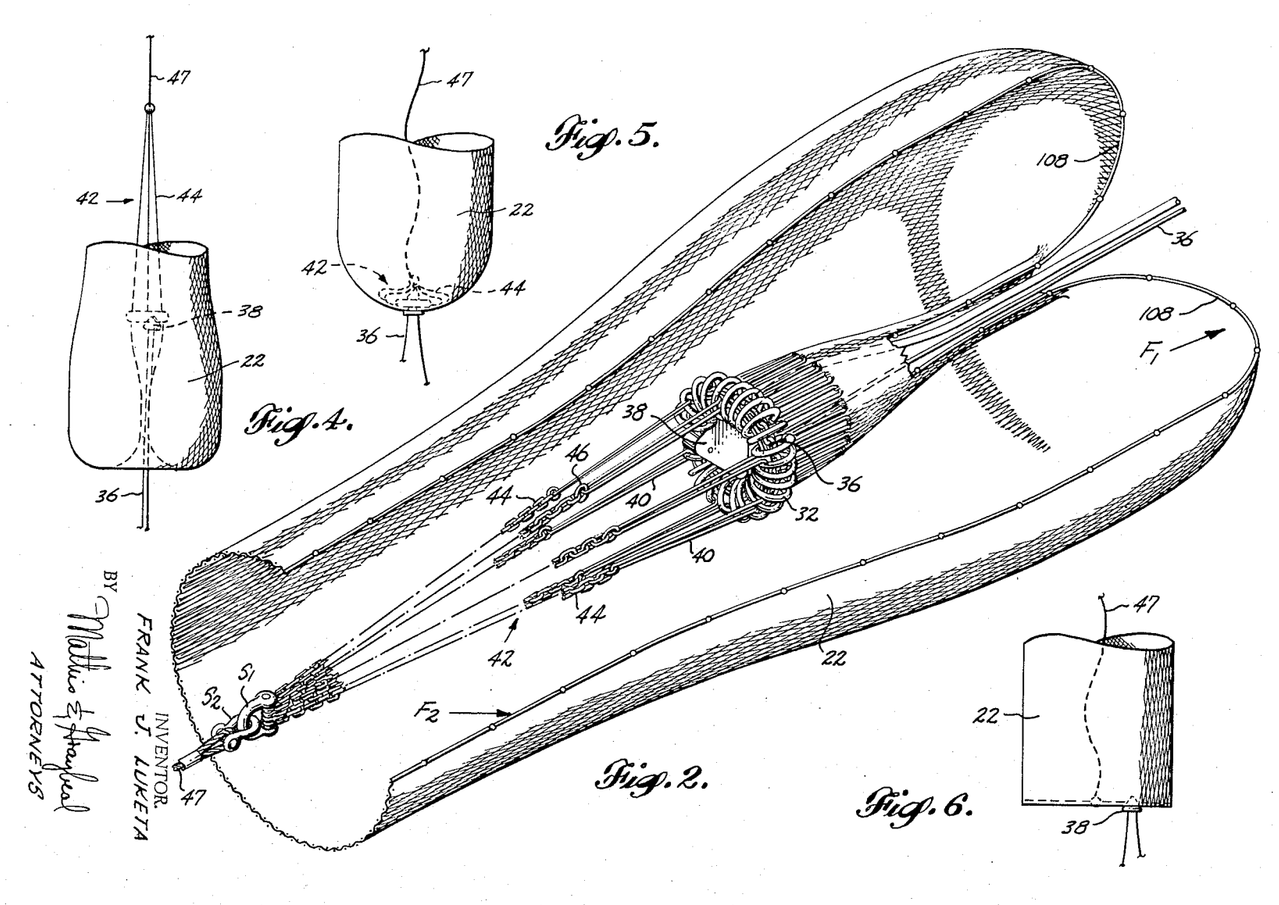
FIG. 2 is an enlarged scale perspective view of the after portion of the net's codend, with the foreground netting cut away for sake of better illustrating the pursed terminal of the codend.
FIG. 4 is a reduced scale, side elevational view of the after portion of the trawl net.
FIG. 5 is a view similar to FIG. 4, but showing the tension relieved from the load line means.
FIG. 6 is a view of that portion of the net shown by FIGS 4 and 5, but showing the after terminal of the codend open.
Figures 3, 10, 11:
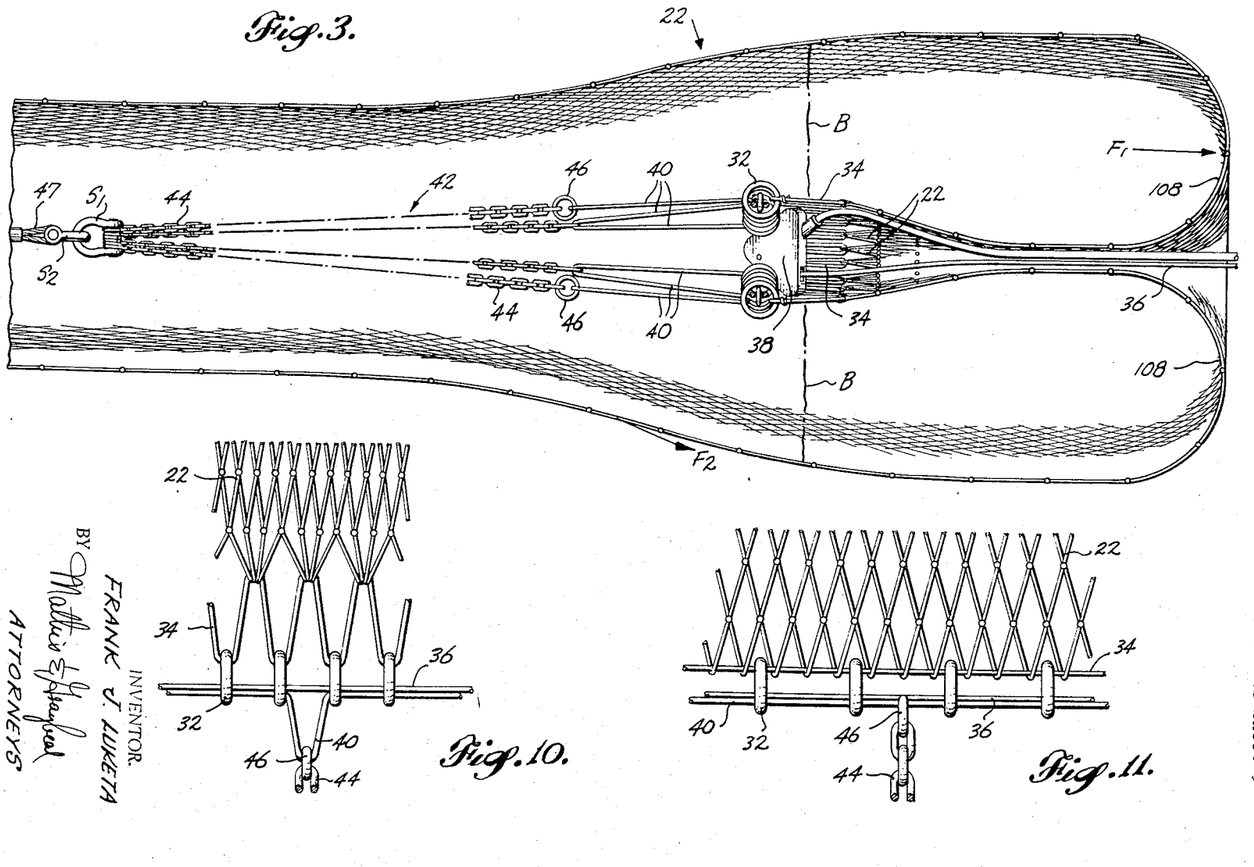
FIG. 3 is a longitudinal sectional view of the after portion of said codend, with the forward boundary of a typical catch being indicated by a wavy broken line.
FIG. 10 is a fragmentary, side elevational view of the codend taken in the vicinity of the pursing mechanism, with such mechanism and the netting to which it is attached being in the partly open condition shown by FIGS. 7 and 8.
FIG. 11 is a view like FIG. 10, but showing the netting and the components of the pursing mechanism as they appear when the after terminal is fully open.

As shown quite clearly in FIGS. 2 and 3, this length differential causes the rear portion of the codend to be turned outside in during trawling. As shown in FIG. 3, this gives the codend what may be termed a semi-toroidal shape rearwardly of the internal position of the pursued terminal of the codend 22. This arrangement also causes the formation of an annular rear wall 108 of mesh for the codend 22.

When the net end is being towed through the water empty, the water moving relatively past the wall 108 resses against and hence exerts a rearwardly directed force on the strands of twine making up the wall 108 of mesh. As fish enter and tend to fill up the codend 22 they also press against the rear wall 108. The forces produced by the water and fish in the net pressing against the rear wall 108 represents a portion of the total drag of the net and its load, and it is this portion of the total drag that is measured by the load sensing equipment of the present invention.

Referring again to FIG. 3, as will be evident, a force F1 pushing rearwardly on wall 108 will cause tension to be put into the load sensing line means 42, 47, 48, 50, 52, whereas a force F2, pushing rearwardly on the portion of codend 22 situated forwardly of wall 108 (or on any other part of the net assembly forwardly of the codend 22) would not put tension in the load sensing line means 42, 47, 48, 50, 52. This is because, with the exception of the greater portion of wall 108, the component parts of the net, commencing with the portion of the codend 22 situated immediately forwardly of the wall 108 and proceeding forwardly to the doors 10, are connected to the doors 10 by the curtain lines 16 and the sweep lines SL in a maner such that the drag produced by those components of the net result in tensioning of the curtain line 16 and sweep lines SL, but not of the load sensing line means 42, 47, 48, 50, 52.

It will also be appreciated that the drag attributed to water and fish in the net pressing rearwardly against the wall 108, which drag is being sensed and measured by the load sensing equipment of the present invention, is relatively small in comparison to the drag produced by the entire net, and smaller yet in comparison to the drag produced by all components in the water rearwardly of the trawler, including, in addition to the net N, the lines 16, SL, the doors 10 and the towing warps 12.

As will be evident, there is a direct relationship to the amount of fish in the codend 22 and the magnitude of the force directed rearwardly against wall 108. Thus, when the signal based on the tension in the load sensing line means 42, 47, 48, 50, 52 (representing the force acting rearwardly against wall 108) is received aboard the trawler, it can be used to give a reliable indication as to the quantity of fish in the net N. The dial of the indicator 106 may be designed so as to indicate the magnitude of the force in the load sensing line means 42, 47, 48, 50, 52, or may be designed to give a direct reading as to the pounds of fish in the net.

As previously mentioned, even when the net is empty, there will be some tension put in the load line sensing means 42, 47, 48, 50, 52 by virtue of water pressing rearwardly against the wall 108. The dial of the indicator device 106 may be made so that it can be set to a new zero reading after the net is set and the drag force on wall 108 when the codend 22 is empty is determined and recorded. Any additional drag that would then be indicated on the dial above zero would be attributed solely to fish in the net pressing rearwardly against the wall 108.

The magnitude of the force produced by fish in the net pressing rearwardly against the wall 108 (the level of a catch of fish, e.g., shrimp, is indicated by the broken line B in FIG. 3, for example) is relatively large in comparison with the force produced by water alone pressing against the wall 108. Also, the maximum total forces which need be measured by the load sensing equipment of the present invention is relatively small in comparison with the maximum total force that would have to be measured if the load sensing equipment were attached to the towing warps 12 and the drag of the entire net assembly were to be measured, much in the manner disclosed in the aforementioned D'Intino Patent No. 2,513,153. For these reasons the increase in force attributed to fish in the net can be reliably and very accurately sensed. Since the total forces involved are relatively small, the indicating and/or recording device 106 need only be capable of measuring a relatively small maximum force. Each increment of force measured represents only a small amount of additional drag. Thus, slight increases in drag can be measured, with the result being that the trawler operator is given a reliable reading which is not overshadowed by a relatively large constant drag (i.e., the load of the entire net N, the lines 16, SL, the doors 10, and the towing warps 12).

As will be evident, the line sensing line means itself produces a slight amount of drag. However, the value of its share of the drag sensed is small in relation to the whole, and allowance can be easily made for it at the utilization equipment.

After the doors 10 and the net N are brought aboard the trawler T, tension is taken out of all of the net components, including the load sensing line means 42, 47, 48, 50, 52, and the codend lock and release mechanism 38 is tripped or unlocked so that the rear of the codend 22 is opened and the catch may be emptied from the net N.

According to the invention, the reason bridle members 44 are made out of chain is so that such members 44 are flexible and can easily be handled during the procedure of opening the codend and dumping the catch. If cable were to be used in place of the chain, the members 44 would be relatively stiff and hard to handle.

The elastic section 48 of the load sensing line means is provided for the purpose of relieving some of the tension in such line means, making it possible to make the lines 47, 50, 52 from relatively small diameter cable. It is preferred that lines 47, 50, 52 be constructed from multiple strands of stainless steel wire that is approximately ⅛ of an inch in diameter.

FIGS. 19–22 relate to modified arrangements of the load sensing equipment according to the present invention. In FIGS. 19 and 20 the load sensing device LS is shown attached to one end of the bobbin assembly. This can easily be done by mounting all parts of such load sensing device LS onto a mounting plate, similiar to mounting plate 70 shown in FIG. 15, and then this mounting plate may be secured to the end of the bobbin line 28. A first elastic member 48′ extends rearwardly from the rocker arm portion of the load sensing device LS to the forward end of line 47, and a second elastic member 48″ extends rearwardly from the opposite end of the bobbin line 28 to such forward end of the line 47. In this form of the invention the conductor 82 extends forwardly from the load sensing device LS directly to the trawler, independent of the towing warp 12.

In the arrangement shown by FIGS. 21 and 22, a mid line ML is provided which extends rearwardly from the trawler T and connects to the opposite ends of the bobbin line 28. Such mid line ML is a part of the towing means for the net assembly. In this form of the invention, the sensing device LS is mounted on the mid line ML at a location ahead of the bobbin line 28. As before, this may be done by mounting all of the components of such load sensing device LS onto a mounting plate similar to plate 70 in FIG. 15, and then connecting such mounting plate to the mid line ML. Line 50′ is connected at its forward end to the rocker arm portion of the load sensing device LS and at its after end to the forward end of the elastic member 48. As before, the after end 48 is attached to the forward end of a line 47 leading rearwardly to the pursed after terminal of the codend 22.

From the foregoing, further variations, adaptations, modifications and characteristic features can be evolved by those skilled in the art to which the invention is addressed within the scope of the following claims.

What is claimed is:

1. In combination with a forwardly open trawl net including a codend having a closed after end portion, and towing means connected to and extending forwardly of said net to a trawler, means for determining the presence and quantity of fish in said net, said means comprising: load sensing line means connected to and extending forwardly of said codend; load sensing means connected to said load sensing line means, said load sensing means serving to measure the amount of tension put into said load sensing line means by reason of water and fish in the net pressing against the after end portion of said codend as the net is towed forwardly, and to derive a signal based on such amount of tension, which signal is indicative of the quantity of fish in the net; means for transmitting said signal to the trawler; and means on the trawler for receiving and utilizing such signal.

2. The combination of claim 1, wherein the said towing means includes at least one trawl door situated forwardly of and connected to said net, between the net and and the trawler, and wherein the said load sensing means is mounted on said trawl door.

3. The combination of claim 1, wherein said towing means includes a suspension means for an intermediate portion of said net, and wherein said load sensing means is connected to said suspension means.

4. The combination of claim 1, wherein the towing means includes mid line means connected to and extending forwardly of said net to the trawler, and wherein the said load sensing means is mounted on said mid line means.

5. The combination of claim 1, wherein the load sensing line means comprises a relatively small diameter line and a resilient line connected thereto.

6. In combination with a trawl net that is open in the forward direction and has a pursed after terminal, and towing means connected to and extending forwardly of said net to a trawler, means for determining the presence and quantity of fish in said net, said means comprising: load sensing means mounted on a portion of said towing means forwardly of said pursed terminal; load sensing line means interconnecting between said load sensing means and the pursed terminal, said load sensing line means being shorter than the distance between the load sensing means and the pursed terminal when the net is fully distended and said load sensing line means is unattached, so that during trawling, when the load sensing line means is attached, the after end portion of the net is pulled outside in by the load sensing line means and assumes a generally semi-toroidal shape, and forms an annular rear wall of mesh for the net, with said load sensing means serving to measure the amount of tension put into said load sensing line means by reason of water and fish in the net pressing against said annular rear wall of mesh, and to derive a signal based on said amount of tension, which signal is indicative of the quantity of fish in the net; means for transmitting said signal to the trawler; and means on the trawler for receiving and utilizing such signal.

7. The combination of claim 6, wherein the load sensing line means includes a bridle comprising a plurality of leg members secured at their after ends to said pursed terminal and coming together at their forward ends, and a line connected to and extending forwardly from said forward ends to said load sensing means.

8. The combination of claim 6, wherein the load sensing line means comprises a relatively small diameter line and a resilient line connected thereto.

9. In combination with a forwardly open trawl net having a pursed after terminal and a generally transverse after wall, load sensing equipment comprising: load sensing line means attached at its after end to the pursed terminal, and load measuring means, including a strain gauge to which the forward end of said load sensing line means is attached, for measuring the tension put in said load sensing line means by water and fish in the net.

10. In a trawl net, a forwardly opening codend of netting including a rear outlet opening, a plurality of eyes distributed about said rear outlet opening, a purse line extending through said eyes and encircling said outlet opening, to be drawn tight or alternatively to be relaxed, a connector line extending through at least some of said eyes and encircling said outlet opening, a bridle comprising a plurality of leg members having rear terminii secured at intervals along said connector line, said leg members extending forwardly from said line, through the interior of said codend, and having forward terminii which are joined together at a location inside said net and a load sensing line connected to and extending forwardly of said forward terminii of the leg members to means for measuring tension therein.

11. The combination of claim 10, wherein the said leg members of the bridle each consist of a relatively short length of chain.

12. The combination of claim 10, wherein said eyes distributed about the rear end opening each consists of a metallic ring secured to a portion of the netting which borders the outlet opening.

13. The combination of claim 10, wherein the connector line is endless and of a length that is at least slightly larger than the circumference of the outlet opening when the purse line is relaxed and the netting immediately surrounding and defining the outlet opening is fully distended.

References Cited
UNITED STATES PATENTS

| | | | |
|---|---|---|---|
| 354,763 | 9/1886 | Bartlett | 43—14 |
| 1,152,081 | 8/1915 | Dingwell | 43—14 |
| 2,609,181 | 9/1952 | Jaeschke | 254—172 |
| 2,723,481 | 11/1955 | Swartz | 43—7 |

OTHER REFERENCES

Modern Fishing Gear of the World published 1959 by Fishing News Ltd., London, England, pages 228, 229 and 233.

ALDRICH F. MEDBERY, *Primary Examiner.*

SAMUEL KOREN, WARNER H. CAMP, *Examiners.*